United States Patent
Tirmizi et al.

(10) Patent No.: US 8,648,226 B2
(45) Date of Patent: Feb. 11, 2014

(54) PROCESS FOR PRODUCING RENEWABLE GASOLINE, AND FUEL COMPOSITIONS PRODUCED THEREFROM

(75) Inventors: Shakeel H. Tirmizi, Matawan, NJ (US); John D. Winter, Houston, TX (US); David T. Gallaspy, Church Hill, TN (US)

(73) Assignee: Range Fuels, Inc., Denver, CO (US)

( * ) Notice: Subject to any disclaimer, the term of this patent is extended or adjusted under 35 U.S.C. 154(b) by 421 days.

(21) Appl. No.: 12/943,174

(22) Filed: Nov. 10, 2010

(65) Prior Publication Data

US 2011/0107661 A1 May 12, 2011

Related U.S. Application Data

(60) Provisional application No. 61/260,563, filed on Nov. 12, 2009, provisional application No. 61/260,580, filed on Nov. 12, 2009, provisional application No. 61/260,611, filed on Nov. 12, 2009.

(51) Int. Cl.
*C10L 1/185* (2006.01)

(52) U.S. Cl.
USPC ............. 585/639; 585/14; 585/240; 585/242; 585/469; 585/638; 585/640; 585/733; 44/436; 44/447; 44/448; 44/449; 44/451; 44/452; 44/453

(58) Field of Classification Search
USPC ........... 585/14, 240–242, 469, 638–640, 733; 44/436, 447–449, 451–453
See application file for complete search history.

(56) References Cited

U.S. PATENT DOCUMENTS

| | | | | |
|---|---|---|---|---|
| 4,524,228 A | * | 6/1985 | Fowles et al. | 585/408 |
| 4,808,270 A | * | 2/1989 | Wernicke et al. | 203/39 |
| 4,981,491 A | * | 1/1991 | Harandi et al. | 44/448 |
| 2006/0014841 A1 | * | 1/2006 | Melnichuk et al. | 518/726 |

* cited by examiner

*Primary Examiner* — Brian McCaig
(74) *Attorney, Agent, or Firm* — O'Connor & Company; Ryan P. O'Connor

(57) ABSTRACT

The present invention provides a process for producing gasoline components from syngas. Syngas is converted to one or more of methanol, ethanol, mixed alcohols, and dimethyl ether, followed by various combinations of separations and reactions to produce gasoline components with oxygenates, such as alcohols. The syngas is preferably derived from biomass or another renewable carbon-containing feedstock, thereby providing a biorefining process for the production of renewable gasoline.

22 Claims, 7 Drawing Sheets

PROCESS FOR PRODUCING RENEWABLE GASOLINE, AND FUEL COMPOSITIONS PRODUCED THEREFROM

PRIORITY DATA

This patent application claims priority under 35 U.S.C. §120 from U.S. Provisional Patent Application Nos. 61/260,563; 61/260,580; and 61/260,611, each filed Nov. 12, 2009, the disclosures of which are hereby incorporated by reference herein for all purposes.

FIELD OF THE INVENTION

The present invention generally relates to processes for the conversion of synthesis gas into renewable liquid fuels, including gasoline.

BACKGROUND OF THE INVENTION

Synthesis gas, which is also known as syngas, is a mixture of gases comprising carbon monoxide (CO) and hydrogen ($H_2$). Generally, syngas may be produced from any carbonaceous material. In particular, biomass such as agricultural wastes, forest products, grasses, and other cellulosic material may be converted to syngas.

Syngas is a platform intermediate in the chemical and biorefining industries and has a vast number of uses. Syngas can be converted into alkanes, olefins, oxygenates, and alcohols such as ethanol. These chemicals can be blended into, or used directly as, diesel fuel, gasoline, and other liquid fuels. Syngas can also be directly combusted to produce heat and power. The substitution of alcohols and/or derivatives of alcohols in place of petroleum-based fuels and fuel additives can be particularly environmentally friendly when the alcohols are produced from feed materials other than fossil fuels.

Gasoline is a refined petroleum product which is burned in the engines powering most of the world's automobiles. Petroleum is a non-renewable resource of finite supply. Acute shortages and dramatic price increases in petroleum and the refined products derived from petroleum have occurred, particularly during the past several decades. Extensive research is now being directed toward replacing a portion of petroleum-based gasoline with a cleaner-burning fuel derived from a renewable resource, such as biomass in a biorefinery.

In recent years, considerable research has been devoted to providing alternative sources and manufacturing routes for liquid hydrocarbon fuels in recognition of the fact that petroleum is a non-renewable resource and that petroleum-based fuels such as gasoline and distillate will ultimately become more expensive.

A major development within the chemical/petroleum industry has been the discovery of the special catalytic capabilities of a family of zeolite catalyst based upon medium-pore size shape selective metallosilicates. Discoveries have been made leading to a series of analogous processes drawn from the catalytic capability of zeolites. Depending upon various conditions of space velocity, temperature, and pressure, methanol can be converted in the presence of zeolite-type catalysts to olefins which can oligomerize to provide gasoline or distillate, or can be converted further to produce aromatics.

It has been demonstrated that alcohols, ethers, and carbonyl-containing compounds can be converted to higher hydrocarbons, particularly aromatics-rich high-octane gasoline, by catalytic conversion employing a shape-selective medium pore acidic zeolite catalyst such as H-ZSM-5. This conversion is described in, among others, U.S. Pat. Nos. 3,894,103; 3,894,104; 3,894,106; 3,907,915; 3,911,041; 3,928,483; and, 3,969,426. The conversion of methanol to gasoline in accordance with this technology (the "MTG" process) produces mainly $C_{5+}$ gasoline-range hydrocarbon products together with $C_3$-$C_4$ gases and $C_9$ heavy aromatics. The desirable $C_6$-$C_8$ aromatics (principally benzene, toluene and xylenes) can be recovered as a separate product slate by conventional distillation and extraction techniques.

Traditional approaches for converting syngas to gasoline involve a two-step process comprising converting syngas to methanol followed by converting methanol to gasoline. What are needed, in view of the art and commercial drivers, are process configurations, apparatus, and suitable catalysts for conversion of syngas into gasoline components as well as oxygenates, such as alcohols, for blending into oxygenated gasoline. Additionally, methods that proceed through higher alcohols (ethanol and heavier) are desired in order to take advantage of the state of the art for ethanol synthesis and higher-alcohol synthesis from syngas.

SUMMARY OF THE INVENTION

In some variations, this invention provides a process for producing gasoline components, the process comprising:
(a) generating or providing syngas;
(b) converting the syngas using an alcohol-synthesis catalyst to a first stream comprising two or more $C_1$-$C_4$ alcohols;
(c) converting at least some of the first stream using an ether-synthesis catalyst to a second stream comprising one or more ethers; and
(d) converting at least some of the second stream using a zeolite catalyst to a third stream comprising one or more gasoline components.

The syngas can be derived, for example, from biomass such as wood chips or from any other carbon-containing feedstock.

In some embodiments, the method further comprises removing a portion of water from the first stream prior to step (c) or step (d). In some embodiments, at least some of this water is not removed.

In some embodiments, the method further comprises separating a portion of the $C_1$-$C_4$ alcohols prior to step (c), and/or a portion of the ethers prior to step (d). The method can additionally include combining the portion of the $C_1$-$C_4$ alcohols and/or the portion of the ethers with the gasoline components, thereby generating oxygenated gasoline components.

In some embodiments, the $C_1$-$C_4$ alcohols include ethanol, and a portion of the ethanol is separated prior to step (c). Optionally, the portion of the ethanol can be combined with the gasoline components, thereby generating ethanol-containing gasoline components.

The gasoline components are not particularly limited but can include at least one $C_5$-$C_{10}$ hydrocarbon. Gasoline components can include branched hydrocarbons, olefins, aromatics, and alcohols.

Certain methods of the invention further include hydrotreating, isomerizing, or otherwise catalytically treating at least some of the gasoline components.

In some embodiments, the gasoline components meet fuel specification ASTM D 4814-09a. Gasoline components can be used directly as gasoline, or blended with another fuel to generate commercial gasoline meeting fuel specification ASTM D 4814-09a or a similar specification.

The third stream can further include non-gasoline components (such as $C_2$-$C_4$ hydrocarbon gases) which are optionally recycled. Alternatively, or additionally, some of the non-gasoline components can be converted into syngas, and the syngas is optionally combined with the syngas provided or generated in step (a).

In some variations, the invention provides a process for producing gasoline components, the process comprising:

(a) generating or providing syngas;
(b) converting the syngas using an alcohol-synthesis catalyst to a first stream comprising two or more $C_1$-$C_4$ alcohols;
(c) converting at least some of the first stream using a zeolite catalyst to one or more olefins; and
(d) converting at least some of the one or more olefins using the zeolite catalyst to a second stream comprising one or more gasoline components.

In other variations of the present invention, a process is provided for producing an oxygenated gasoline blendstock, the process comprising:

(a) generating or providing syngas, optionally derived from biomass;
(b) dividing the syngas into a first syngas stream and a second syngas stream;
(c) converting at least some of the first syngas stream to methanol using a methanol-synthesis catalyst;
(d) converting at least some of the methanol to one or more gasoline components using a zeolite catalyst;
(e) converting at least some of the second syngas stream to two or more $C_1$-$C_4$ alcohols using an alcohol-synthesis catalyst; and
(f) combining a portion of the $C_1$-$C_4$ alcohols with a portion of the gasoline components, thereby producing an oxygenated gasoline blendstock.

The process can include removing a portion of water from the product stream generated in step (e). In some embodiments, at least some of the water is not removed.

The $C_1$-$C_4$ alcohols include methanol, in some embodiments, which methanol (or a portion thereof) can be recycled to step (d) for conversion to one or more gasoline components using a zeolite or other functionally equivalent catalyst.

In some embodiments, a portion of the $C_1$-$C_4$ alcohols are separated out prior to step (f). This portion of $C_1$-$C_4$ alcohols can be combined with the gasoline components, thereby generating an oxygenated gasoline blendstock.

In some embodiments, the $C_1$-$C_4$ alcohols include ethanol, and the process further comprises separating a portion of the ethanol prior to step (f). The ethanol can then be combined with gasoline components, thereby generating ethanol-containing gasoline components.

Variations of the invention provide a process for converting syngas to liquid transportation fuels, the process comprising:

(a) generating or providing syngas (optionally derived from biomass);
(b) dividing the syngas into a first syngas stream and a second syngas stream;
(c) converting at least some of the first syngas stream to methanol using a methanol-synthesis catalyst;
(d) converting at least some of the methanol to one or more gasoline components using a zeolite catalyst; and
(e) converting at least some of the second syngas stream to ethanol using a biocatalyst, such as suitable yeast or bacteria.

A portion of the ethanol can be combined with a portion of the gasoline components, thereby producing a gasoline blendstock containing ethanol. In some embodiments, the process further includes converting at least some of the ethanol to one or more gasoline components using the zeolite catalyst. The output of step (d) and the output of step (e) can be, but are not necessarily, combined.

Other variations of the invention relate to compositions. In some embodiments, a composition comprises the gasoline components produced in accordance with any of the methods described herein. In some embodiments, a composition consists essentially of the gasoline components produced in accordance with any of the methods described herein.

In some embodiments, compositions include durene or structurally similar molecules.

In some embodiments, compositions include about 2.7 wt % oxygen or less. In other embodiments, compositions include greater than 2.7 wt % oxygen.

Compositions of the invention can be ethanol-free, or include up to about 9-10 vol % ethanol, or can include greater than 10 vol % ethanol, such as about 12 vol %, 15 vol %, 20 vol %, or more ethanol. In some embodiments, compositions include about 2.75 vol % methanol or less, such as about 0.3 vol % methanol or less. Certain compositions contain greater than 2.75 vol % methanol.

Figure 1:
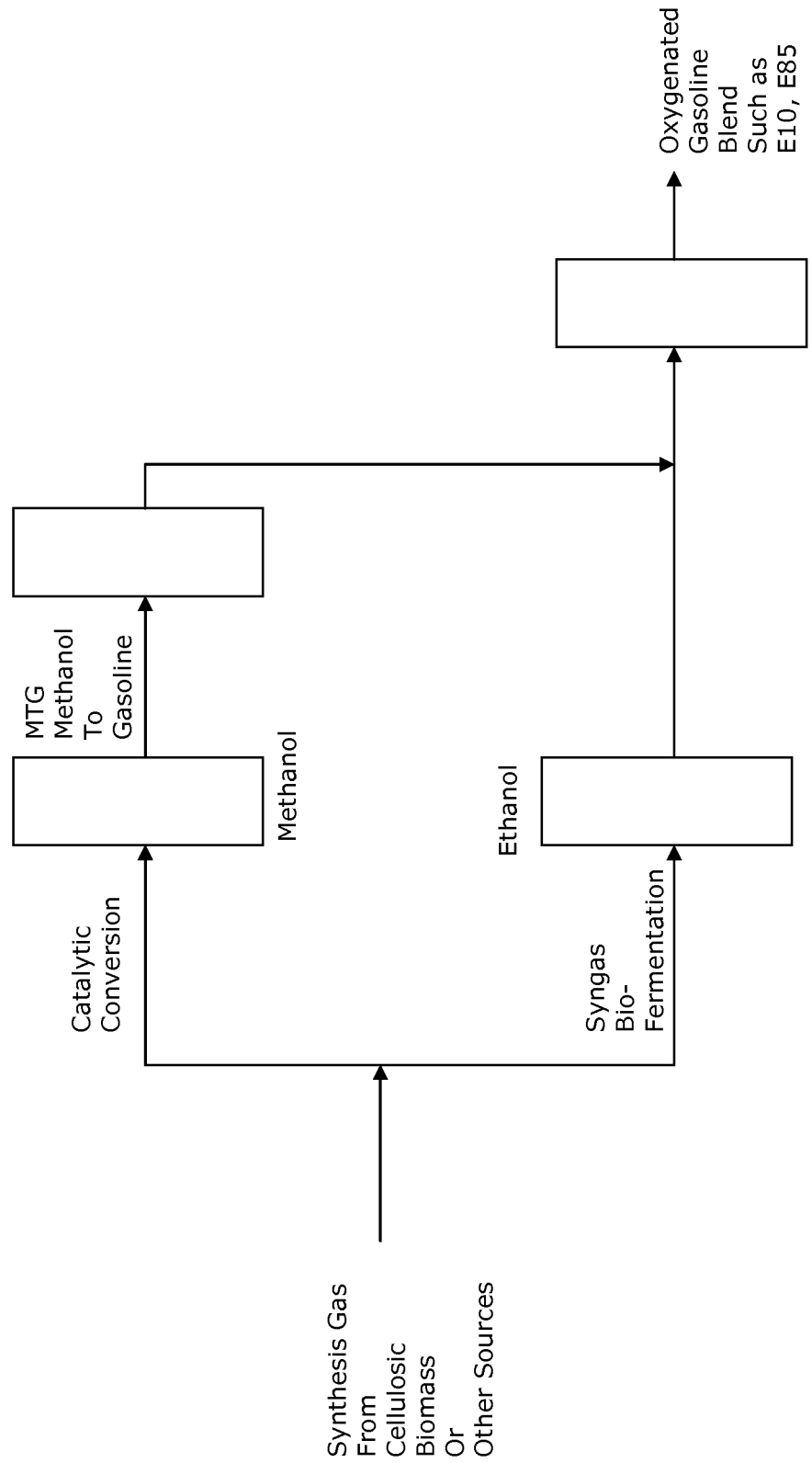
FIG. 1 is a block-flow diagram depicting an exemplary process for conversion of syngas to methanol and ethanol, conversion of methanol to gasoline, and optional combination of gasoline and ethanol into oxygenated blends, according to some embodiments of the invention.

These and other embodiments, features, and advantages of the present invention will become more apparent to those skilled in the art when taken with reference to the following detailed description of the invention in conjunction with the accompanying drawings.

DETAILED DESCRIPTION OF EMBODIMENTS OF THE INVENTION

Certain embodiments of the present invention will now be further described in more detail, in a manner that enables the claimed invention so that a person of ordinary skill in this art can make and use the present invention.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. If a definition set forth in this section is contrary to or otherwise inconsistent with a definition set forth in patents, published patent applications, and other publications that are herein incorporated by reference, the definition set forth in this specification prevails over the definition that is incorporated herein by reference.

Variations of this invention are premised, at least in part, on the conversion of syngas into gasoline components as well as one or more alcohols, in various combinations. A "gasoline component" as used herein means any molecule capable of being combusted in an internal-combustion engine to provide power for an automobile or other machine burning gasoline for energy. Gasoline components include alkanes, olefins, cyclic hydrocarbons, aromatics, and various oxygenates such as alcohols, ethers, ketones, and aldehydes.

Some variations of the invention relate to an integrated biorefinery capable of producing one or more liquid transportation fuels, including oxygenated fuels. In some embodiments, the invention provides a process that converts syngas into gasoline components. In some embodiments, the invention provides a process that converts syngas into alcohol fuels such as methanol, ethanol, propanol, butanol, and/or heavier alcohols, including various isomers. Certain embodiments also produce dimethyl ether (DME) from syngas; the DME itself is a suitable liquid fuel (e.g., diesel fuel), can be combined with other liquids, or can be chemically converted into gasoline components.

In some variations, syngas is produced or otherwise provided in a biorefinery. The syngas can be divided into a plurality of streams and fed to several unit operations. Biorefinery optimization can be carried out to adjust the splits to the different units, for economic reasons. Syngas can be a fuel itself to provide internal process energy, or sold directly as a co-product, or converted into electricity for external sale. At least a portion of the syngas, in the context of the present invention, is converted to liquid fuels.

Engineering optimization can be conducted to achieve energy integration. For example, energy requirements for product separations can be reduced by combining portions of the product streams from individual processes into a single unit, such as distillation and drying. Various levels of heat recovery can be employed to meet drying and separation requirements.

Also, specifications on intermediate streams can be relaxed to reduce energy requirements. For example, the mixed-alcohol stream can be fed to an alcohol-to-gasoline process without separation of individual alcohols. In some embodiments, mixed alcohols or individual alcohols stream are partially (but not completely) dried for feeding into an alcohols-to-gasoline step, thereby reducing drying requirements and costs. In some embodiments, a methanol stream is allowed to contain ethanol in excess of that described in an ASTM specification, such as 1-2 vol %, for feeding to an alcohol-to-gasoline step, thereby reducing energy costs. In some embodiments, ethanol is substantially separated from mixed alcohols, and the methanol and $C_{3+}$ alcohols are fed to an alcohols-to-gasoline step. The methanol and mixed alcohols optionally are partially dehydrated.

In the present invention, it may be preferable to use alcohols larger than methanol to conduct the reactions to produce components or precursors of gasoline. Alcohols such as ethanol, propanol, butanol, and $C_{5+}$ alcohols (including all isomers) are desirable in some embodiments.

Various embodiments of the invention produce one or more gasoline components selected from the group consisting of 1-butene, 2-methylpropene, 2-methylbutane, 4-methylpentene, methylcyclopentane, benzene, toluene, ethylbenzene, m-xylene, p-xylene, o-xylene, 1-ethyl-4-methylbenzene, 1,2,4-trimethylbenzene, 1-methyl-4-(ethylmethyl)-benzene, 1,2-diethylbenzene, 1-ethyl-2,4-dimethylbenzene, 2,3-dihydro-1-methyl-1-indene, naphthalene, 2-methylnaphthalene, 1,8-dimethylnaphthalene, 2-(1-methylethyl)-naphthalene, methanol, ethanol, 1-propanol, 2-propanol, 1-butanol, 2-butanol, isobutanol, t-butanol, dimethyl ether, diethyl ether, and methylethyl ether. Other alkanes, olefins, cyclic hydrocarbons, aromatics, and oxygenates (such as alcohols and ethers) can be produced.

Also, in some embodiments, light components (such as methane, ethane, and propane) may be recovered as fuel gas suitable for energy requirements within the biorefinery. In certain embodiments, crude gasoline components may be distilled to produce a fuel-grade LPG-type stream and a gasoline stream.

The present invention will now be further described by reference to the figures. This exemplary detailed description illustrates by way of example, not by way of limitation, the principles of the invention.

In FIGS. 1 to 7, process block-flow diagrams are depicted for various processes of the invention.

FIG. 1 is a block-flow diagram depicting an exemplary process for conversion of syngas to methanol and ethanol, conversion of methanol to gasoline, and optional combination of gasoline and ethanol into oxygenated blends, according to some embodiments of the invention. In this variation, a starting syngas stream is provided (e.g., produced from biomass or otherwise received). The starting syngas stream can be divided into at least two streams, with a first stream for catalytic conversion to methanol and a second stream for catalytic or biocatalytic conversion to ethanol. The methanol can be converted to gasoline components, which can then be combined with some or all of the ethanol produced (for example, at about 10 vol % or another commercially relevant concentration of ethanol).

Figure 2:
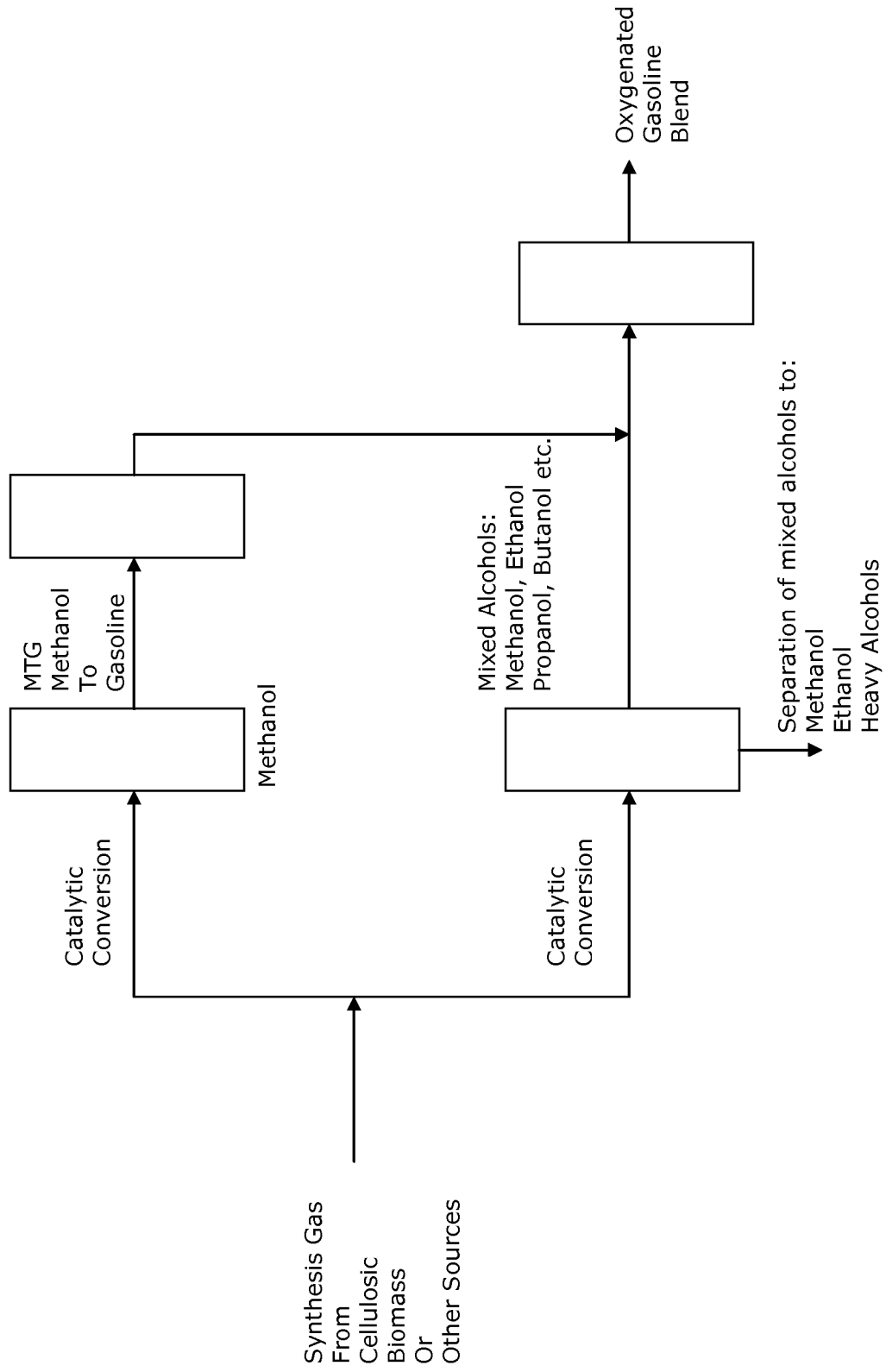
FIG. 2 is a block-flow diagram depicting an exemplary process for conversion of syngas to methanol and mixed alcohols, conversion of methanol to gasoline, and optional combination of gasoline and mixed alcohols into oxygenated blends, according to some embodiments.

FIG. 2 is a block-flow diagram depicting an exemplary process for conversion of syngas to methanol and mixed alcohols, conversion of methanol to gasoline, and optional combination of gasoline and mixed alcohols into oxygenated blends, according to some embodiments. In this variation, a starting syngas stream is provided. The starting syngas stream can be divided into at least two streams, with a first stream for catalytic conversion to methanol and a second stream for catalytic conversion to mixed alcohols (e.g., $C_1$-$C_4$ alcohols). The methanol can be converted to gasoline components, which can then be combined with some or all of the mixed alcohols produced.

Figure 3:
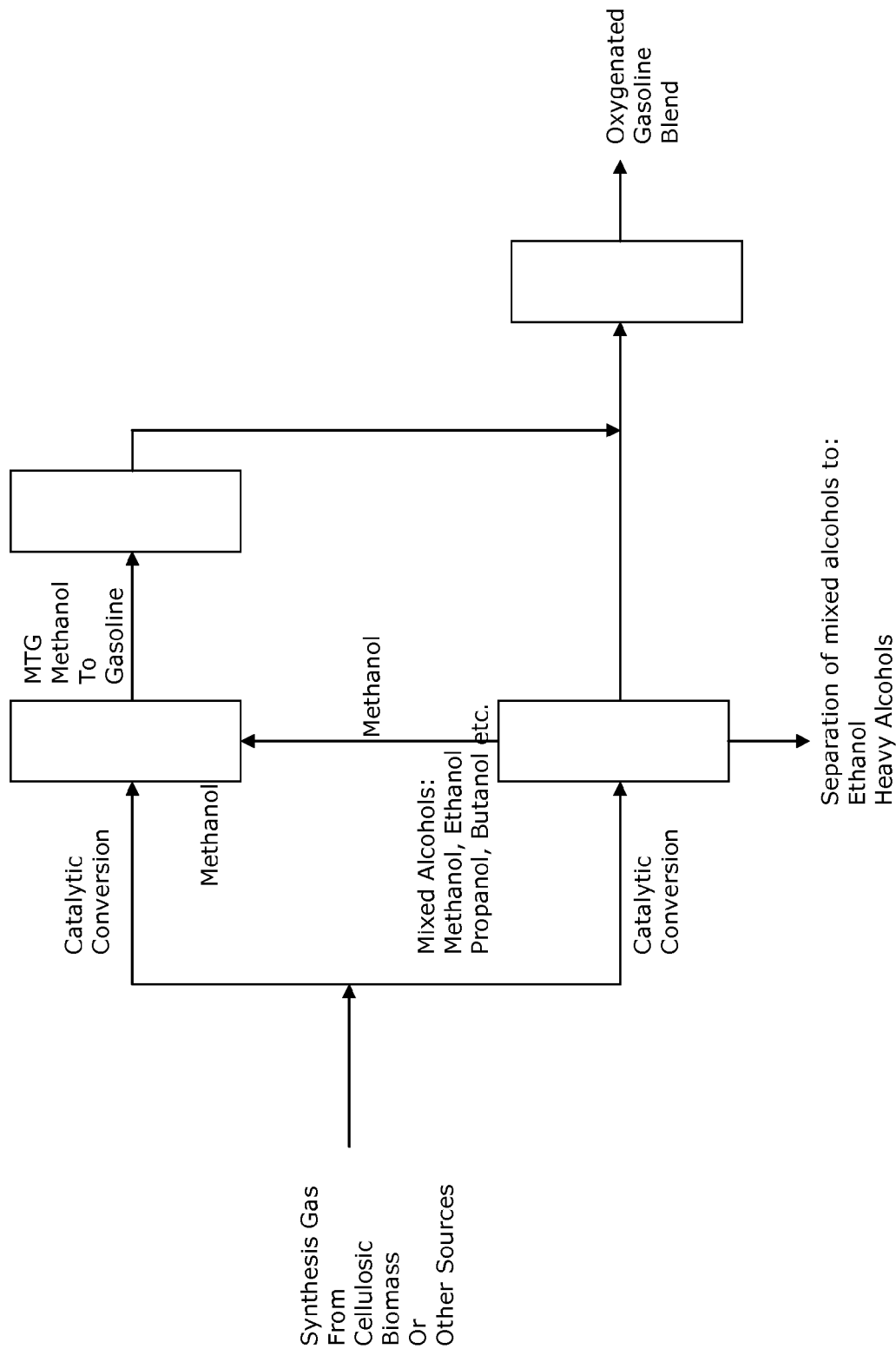
FIG. 3 is a block-flow diagram depicting an exemplary process for conversion of syngas to methanol plus mixed alcohols, separation of some methanol from the mixed alcohols, conversion of methanol to gasoline, and optional combination of gasoline and mixed alcohols into oxygenated blends, according to some embodiments.

FIG. 3 is a block-flow diagram depicting an exemplary process for conversion of syngas to methanol plus mixed alcohols, separation of some methanol from the mixed alcohols, conversion of methanol to gasoline, and optional combination of gasoline and mixed alcohols into oxygenated blends, according to some embodiments. In this variation, a starting syngas stream is provided. The starting syngas stream can be divided into at least two streams, with a first stream for catalytic conversion to methanol and a second stream for catalytic conversion to mixed alcohols. From the mixed-alcohol stream, at least some of the methanol can be removed. Methanol from either or both streams can be converted to gasoline components and optionally combined with some or all of the remaining mixed alcohols.

Figure 4:
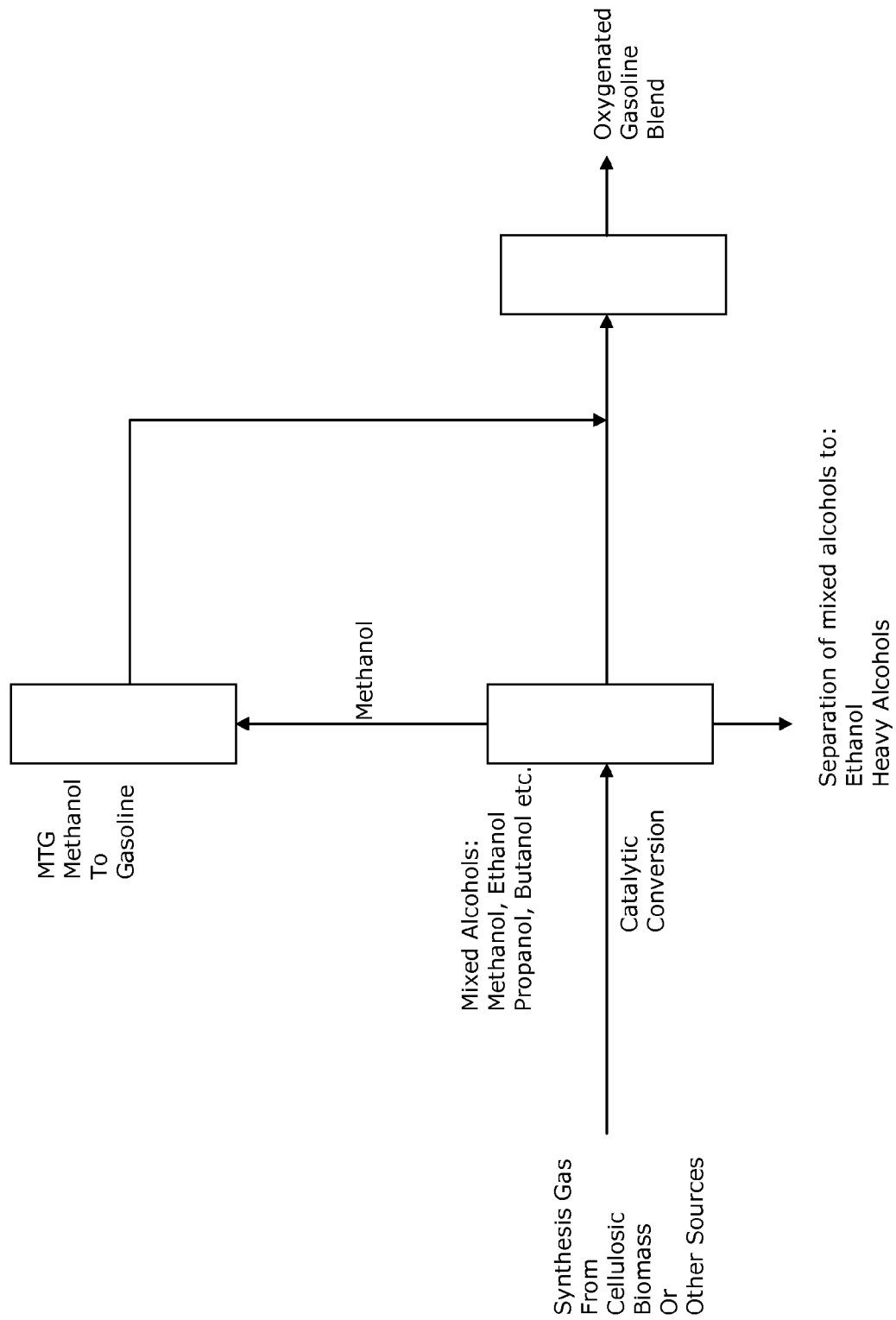
FIG. 4 is a block-flow diagram depicting an exemplary process for conversion of syngas to mixed alcohols, separation of some methanol from mixed alcohols, conversion of methanol to gasoline, and optional combination of gasoline and mixed alcohols into oxygenated blends, according to some embodiments.

FIG. 4 is a block-flow diagram depicting an exemplary process for conversion of syngas to mixed alcohols, separation of some methanol from mixed alcohols, conversion of methanol to gasoline, and optional combination of gasoline and mixed alcohols into oxygenated blends, according to some embodiments. In this variation, a starting syngas stream is provided. The starting syngas stream is fed (without separation into multiple syngas streams) to a unit for catalytic conversion to mixed alcohols. From the mixed-alcohol stream, at least some of the methanol can be removed. Methanol can be converted to gasoline components and optionally combined with some or all of the remaining mixed alcohols.

Figure 5:
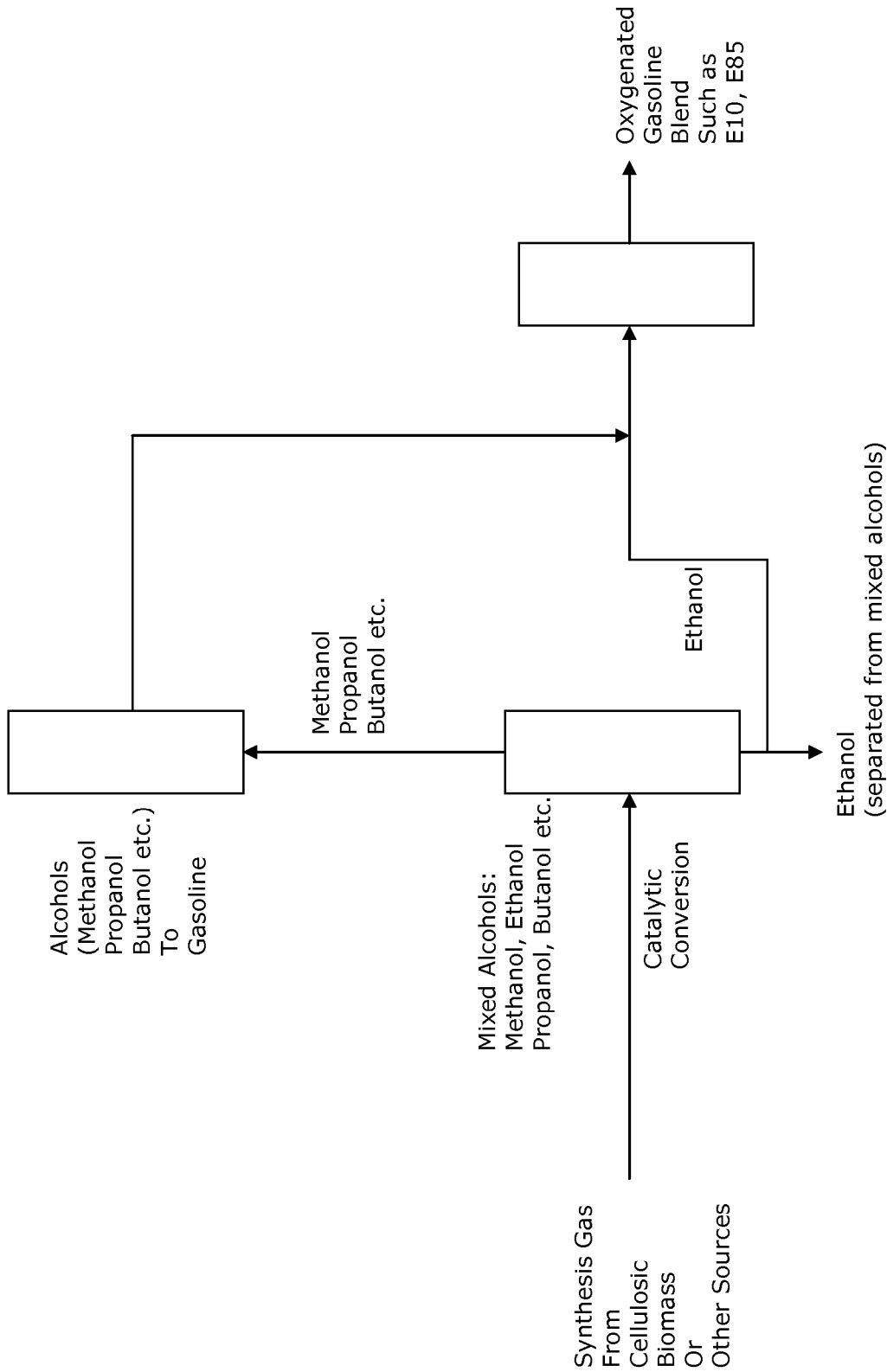
FIG. 5 is a block-flow diagram depicting an exemplary process for conversion of syngas to mixed alcohols, separation of some ethanol out of the mixed-alcohol mixture, conversion of the remainder of the mixed-alcohol mixture to gasoline, and optional combination of gasoline with the separated ethanol (or part thereof) into oxygenated blends, according to some embodiments.

FIG. 5 is a block-flow diagram depicting an exemplary process for conversion of syngas to mixed alcohols, separation of some ethanol out of the mixed-alcohol mixture, conversion of the remainder of the mixed-alcohol mixture to gasoline, and optional combination of gasoline with the separated ethanol (or part thereof) into oxygenated blends, according to some embodiments. In this variation, a starting syngas stream is provided. The starting syngas stream is fed (without separation into multiple syngas streams) to a unit for catalytic conversion to mixed alcohols. From the mixed-alcohol stream, at least some of the ethanol can be removed. The remaining mixed alcohols are converted to gasoline components and optionally combined with some or all of the ethanol that was removed.

Figure 6:
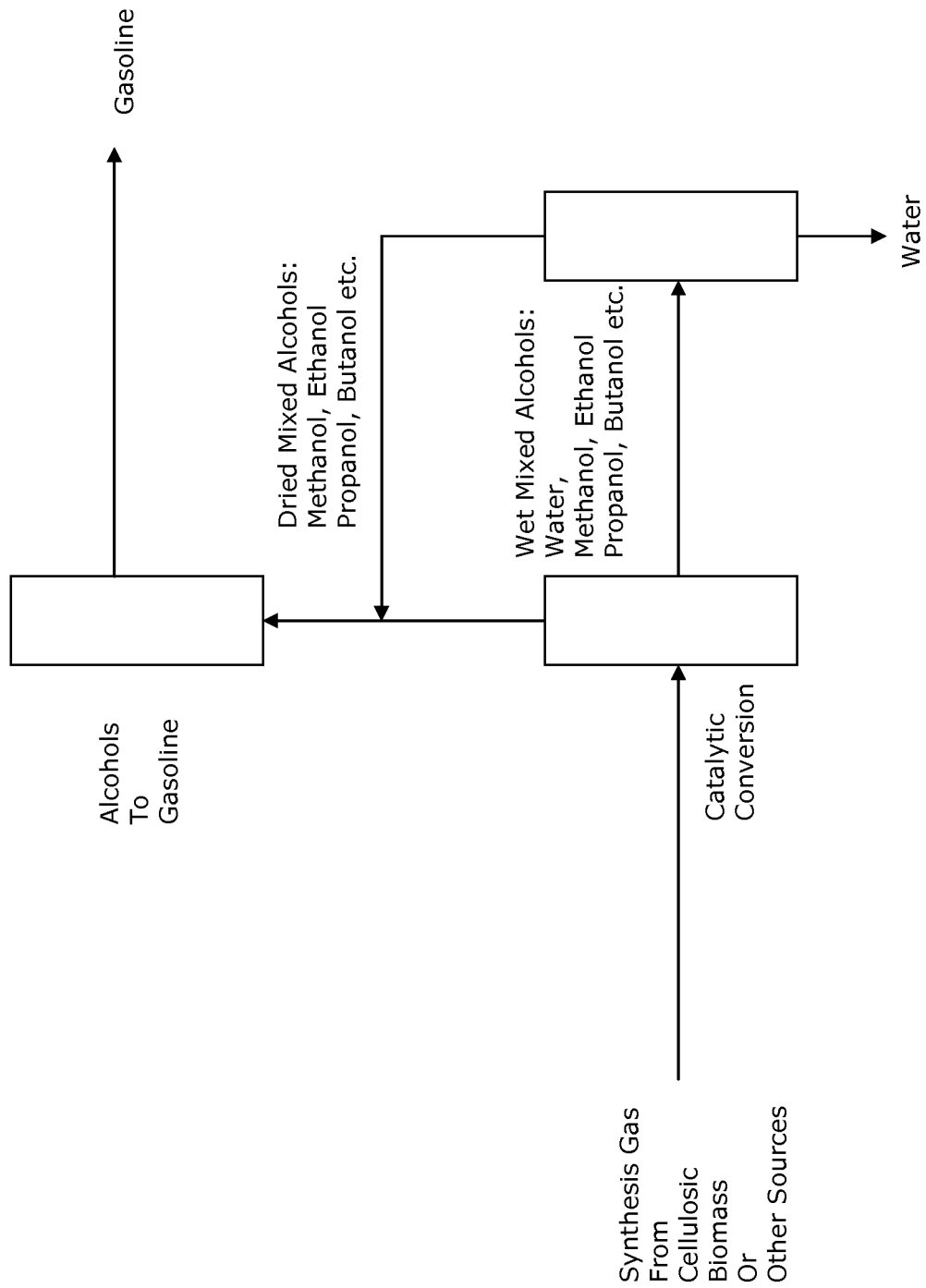
FIG. 6 is a block-flow diagram depicting an exemplary process for conversion of syngas to mixed alcohols which are optionally dehydrated and then converted directly to gasoline components, according to some embodiments of the invention.

FIG. 6 is a block-flow diagram depicting an exemplary process for conversion of syngas to mixed alcohols which are optionally dehydrated and then converted directly to gasoline components, according to some embodiments of the invention. In this variation, a starting syngas stream is provided. The starting syngas stream is fed (without separation into multiple syngas streams) to a unit for catalytic conversion to mixed alcohols. The mixed alcohols are converted to gasoline components.

Figure 7:
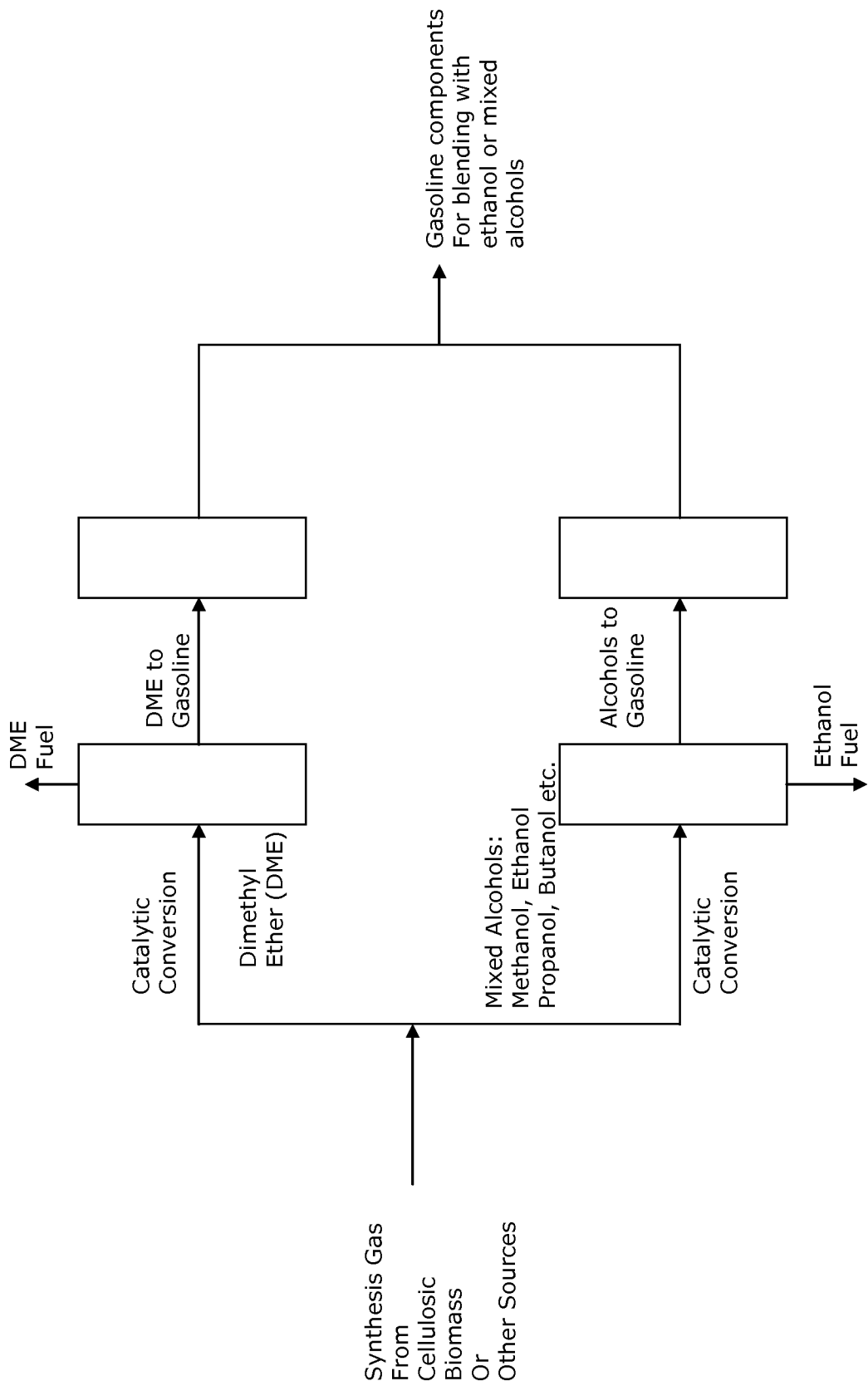
FIG. 7 is a block-flow diagram depicting an exemplary process for conversion of syngas to dimethyl ether and mixed alcohols, which are both converted to gasoline components with an optional separation step or steps to recover a portion of dimethyl ether or a portion of ethanol, according to some embodiments of the invention.

FIG. 7 is a block-flow diagram depicting an exemplary process for conversion of syngas to dimethyl ether and mixed alcohols, which are both converted to gasoline components with an optional separation step or steps to recover a portion of dimethyl ether or a portion of ethanol, according to some embodiments of the invention. In this variation, a starting syngas stream is provided. The starting syngas stream can be divided into at least two streams, with a first stream for catalytic conversion to dimethyl ether and a second stream for catalytic conversion to mixed alcohols. The dimethyl ether can be converted to gasoline components, which can then be combined with some or all of the mixed alcohols produced. Or, both of the dimethyl ether and the mixed alcohols can be converted to gasoline components. Optionally, an alcohol (such as ethanol) is removed from the mixed alcohols prior to an alcohol-to-gasoline step, wherein at least some of that ethanol can be later combined with the produced gasoline components. As another option, some dimethyl ether can be captured as a co-product in the process.

The syngas can be produced from biomass, but that is not necessary for this invention. Other sources of syngas include, for example, natural gas, coal, crude oil, and any other carbonaceous material.

In some embodiments, the syngas provided or generated for methods of this invention is produced from one or more carbon-containing feedstocks selected from timber harvesting residues, softwood chips, hardwood chips, tree branches, tree stumps, leaves, bark, sawdust, paper pulp, corn stover, wheat straw, rice straw, sugarcane bagasse, switchgrass, miscanthus, animal manure, municipal solid waste, municipal sewage, commercial waste, used tires, grape pumice, almond shells, pecan shells, coconut shells, coffee grounds, grass pellets, hay pellets, wood pellets, cardboard, paper, plastic, rubber, cloth, coal, lignite, coke, lignin, and/or petroleum. Mixtures of any of these feedstocks can be used.

Syngas can be produced by any known means, such as by one or more of gasification, pyrolysis, devolatilization, steam reforming, and partial oxidation of one or more feedstocks recited herein.

The syngas-generation unit or step may be a gasifier, such as a fluidized-bed gasifier. In variations, the gasifier type may be entrained-flow slagging, entrained flow non-slagging, transport, bubbling fluidized bed, circulating fluidized bed, or fixed bed. Some embodiments employ known gasification catalysts. "Gasification" and "devolatilization" generally refer herein to the reactive generation of a mixture of at least CO, $CO_2$, and $H_2$, using oxygen, air, and/or steam as the oxidant(s).

In some embodiments, syngas is produced by the methods taught in U.S. patent application Ser. No. 12/166,167, entitled "METHODS AND APPARATUS FOR PRODUCING SYNGAS," filed Jul. 1, 2008, whose assignee is the same as the assignee of this patent application, and which is hereby incorporated herein by reference.

Syngas can be efficiently converted to methanol according to well-known techniques known in the art. Carbon monoxide and hydrogen react over commercially available catalysts to produce methanol. Today, a widely used catalyst is a mixture of copper, zinc oxide, and alumina first used by ICI in 1966. At 50-100 atm and 250° C., the production of methanol from carbon monoxide and hydrogen proceeds with high selectivity.

Syngas can be selectively converted to mixed $C_1$-$C_4$ alcohols by means of a chemical catalyst, such as described in U.S. patent application Ser. No. 12/166,203, entitled "METHODS AND APPARATUS FOR PRODUCING ALCOHOLS FROM SYNGAS," filed Jul. 1, 2008, whose assignee is the same as the assignee of this patent application, and which is hereby incorporated herein by reference.

Any suitable catalyst or combination of catalysts may be used in reactors for producing alcohols. Suitable catalysts may include, but are not limited to, one or more of $ZnO/Cr_2O_3$, $Cu/ZnO$, $Cu/ZnO/Al_2O_3$, $Cu/ZnO/Cr_2O_3$, $Cu/ThO_2$, Co/Mo/S, Co/S, Mo/S, Ni/S, Ni/Mo/S, Ni/Co/Mo/S, Rh, Ti, Fe, Ir, and any of the foregoing in combination with Mn and/or V. The addition of basic promoters (e.g. K, Li, Na, Rb, Cs, and Fr) increases the activity and selectivity of some of these catalysts for alcohols. Basic promoters include alkaline-earth and rare-earth metals. Non-metallic bases can also serve as effective promoters, in some embodiments.

In certain embodiments, such as that shown in FIG. 1, syngas is fermented to ethanol in a process step. Bioconversion of CO or $H_2/CO_2$ to acetic acid, ethanol, or other products is well known. For example, syngas biochemical pathways and energetics of such bioconversions are summarized by Das and Ljungdahl, "Electron Transport System in Acetogens" and by Drake and Kusel, "Diverse Physiologic Potential of Acetogens," appearing respectively as Chapters 14 and 13 of *Biochemistry and Physiology of Anaerobic Bacteria*, L. G. Ljungdahl eds., Springer (2003).

Any suitable microorganisms may be utilized that have the ability to convert CO, $H_2$, or $CO_2$, individually or in combination with each other or with other components that are typically present in syngas. A large number of anaerobic organisms including carboxydotrophic, photosynthetic, methanogenic, and acetogenic organisms have been shown to metabolize CO to various end products. Anaerobic bacteria, such as those from the genus *Clostridium*, have been demonstrated to produce ethanol from CO, $H_2$, or $CO_2$ via the acetyl CoA biochemical pathway. For example, various strains of *Clostridium ljungdahlii* that produce ethanol from gases are described in U.S. Pat. Nos. 5,173,429, 5,593,886, and 6,368,819.

Generally speaking, microorganisms suitable for syngas fermentation in the context of the present invention may be selected from many genera including *Clostridium, Moorella, Carboxydothermus, Acetogenium, Acetobacterium, Butyribacterium, Peptostreptococcus,* and *Geobacter*. Microorganism species suitable for syngas fermentation in this invention may be selected from *Clostridium ljungdahli, Clostridium autoethanogenum, Clostridium ragsdalei, Clostridium carboxidivorans, Butyribacterium methylotrophicum, Eurobacterium limosum,* and genetically engineered, mutated, or evolved variations thereof. Microorganisms that are engineered, created, or provided in the future will be applicable to the present invention, provided such new microorganisms can convert one or more of CO, $H_2$, or $CO_2$ to a product of interest.

Reactors for conversion of one or more alcohols to gasoline components are any type of reactor suitable for carrying out alcohol-to-gasoline chemistry. Preferably, alcohol-to-gasoline reactors include one or more zeolite catalysts effective for conversion of alcohols to gasoline components. A "zeolite catalyst" as used herein includes molecular sieves and other equivalent functional forms.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. These materials have come to be known as "molecular sieves" and are utilized in a variety of ways to take advantage of these properties.

Molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, e.g., an alkali metal or an alkaline earth metal cation.

One type of cation may be exchanged either entirely or partially with another type of cation utilizing ion-exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of the zeolites have come to be designated by letter or other convenient symbols, as illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449), zeolite ZS-20 (U.S. Pat. No. 3,972,983); zeolite ZSM-35 (U.S. Pat. No. 4,016,245); and zeolite ZSM-23 (U.S. Pat. No. 4,076,842), for example.

The $SiO_2/Al_2O_3$ ratio of a given zeolite is variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques.

A "reactor" described herein may be any type of catalytic reactor suitable for the conversion of syngas to alcohol mixtures. A reactor may, for example, be any suitable fixed-bed reactor. In some variations, a reactor comprises tubes filled with one or more catalysts. Syngas passing through the tubes undergoes catalyzed reactions to form alcohols or other products.

The reactor for converting syngas into alcohols can be engineered and operated in a wide variety of ways. The reactor operation can be continuous, semicontinuous, or batch. Operation that is substantially continuous and at steady state is preferable. The flow pattern can be substantially plug flow, substantially well-mixed, or a flow pattern between these extremes. The flow direction can be vertical-upflow, vertical-downflow, or horizontal. A vertical configuration can be preferable.

Any "reactor" used herein can in fact be a series or network of several reactors in various arrangements. For example, in some variations, the reactor comprises a large number of tubes filled with one or more catalysts.

The catalyst phase can be a packed bed or a fluidized bed. The catalyst particles can be sized and configured such that the chemistry is, in some embodiments, mass-transfer-limited or kinetically limited. The catalyst can take the form of a powder, pellets, granules, beads, extrudates, and so on. When a catalyst support is optionally employed, the support may assume any physical form such as pellets, spheres, monolithic channels, etc. The supports may be coprecipitated with active metal species; or the support may be treated with the catalytic metal species and then used as is or formed into the aforementioned shapes; or the support may be formed into the aforementioned shapes and then treated with the catalytic species.

Reactors can consist of a simple vessel or tank, which can be stirred or unstirred. Preferably, reactors are closed reaction vessels, to prevent loss of chemicals to the atmosphere. The reactions may be conducted batch-wise, continuously, or semi-continuously.

The reaction temperature, pressure, and residence time for each process step are each not regarded as critical, provided that overall conditions are suitable for a desired conversion.

In general, solid, liquid, and gas streams produced or existing within the process can be independently passed to subsequent steps or removed/purged from the process at any point. Also, any of the streams or materials present may be subjected to additional processing, including heat addition or removal, mass addition or removal, mixing, various measurements and sampling, and so forth.

In some embodiments, the process is controlled or adjusted to attain certain gasoline properties. As is known, relevant gasoline properties can include flash point, octane number, energy content, water content, sediment content, ash content, sulfur content, nitrogen content, phosphorus content, pH, density, viscosity, and so on.

Other variations of this invention relate to compositions. Some variations provide a gasoline composition in accordance with any of the processes described herein. Other variations provide per se novel gasoline compositions, regardless of the process used to produce those compositions.

In some embodiments, gasoline components are provided by a process comprising converting a mixed-alcohol stream containing methanol, ethanol, propanol, butanol, and heavier alcohols. The mixed-alcohol stream, in some embodiments, contains a Schulz-Flory distribution of alcohols. In certain embodiments, the mixed-alcohol stream contains less ethanol than predicted by a Schulz-Flory distribution of alcohols, i.e. a portion or all of the ethanol can be removed from the stream prior to conversion to gasoline components. A mixed-alcohol stream can contain less than 1 vol %, between about 1-5 vol %, between about 5-10 vol %, or more than 10 vol % ethanol prior to conversion to gasoline components, in various embodiments.

Some variations produce or provide gasoline mixed with alcohols, which alcohols can be (but are not necessarily) produced by the methods of the invention.

Some compositions of the invention relate to gasoline produced primarily from methanol, and containing small amounts of heavier alcohols such as ethanol, propanol, and butanol.

Some compositions of this invention are cellulosic gasoline blends comprising gasoline components plus cellulosic ethanol at a concentration such as 5-15 vol %, e.g. about 10 vol % ethanol.

Some compositions provided herein include cellulosic gasoline components derived from an alcohol-to-gasoline crude stream and requiring no further processing such as hydrotreatment.

Some compositions produced by methods of this invention include durenes. In some embodiments, compositions are provided that discourage or eliminate precipitation of durene crystals out of the liquid composition.

Preferred compositions are capable of burning in an internal combustion engine. Preferred compositions are suitable directly as a gasoline fuel, or as components of gasoline In some embodiments, the gasoline composition meets the specification set forth in ASTM D 4814 as amended, e.g. D 4814-09a which is hereby incorporated by reference herein. Certain preferred compositions exceed current fuel-grade blended gasoline requirements such as octane number, benzene content, Reid vapor pressure, and sulfur content.

The present invention has utility with respect to biorefinery concepts. Final product mixes from a biorefinery can be optimized for maximum profitability and/or minimum carbon footprint, for example, by known techniques. Preferred embodiments of the invention can reduce overall energy intensity and/or reduce the number of processing steps to manufacture renewable gasoline.

All publications, patents, and patent applications cited in this specification are incorporated herein by reference in their entirety as if each publication, patent, or patent application was specifically and individually put forth herein. All ASTM specifications recited herein are also incorporated by reference.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent that there are variations of the invention, which are within the spirit of the disclosure or equivalent to the inventions found in the appended claims, it is the intent that this patent will cover those variations as well. The present invention shall only be limited by what is claimed.

What is claimed is:

1. A process for producing gasoline components, said process comprising:
   (a) generating or providing syngas;
   (b) converting said syngas using an alcohol-synthesis catalyst to a first stream comprising two or more $C_1$-$C_4$ alcohols;
   (c) converting at least some of said first stream using an ether-synthesis catalyst to a second stream comprising one or more ethers; and
   (d) converting at least some of said second stream using a zeolite catalyst to a third stream comprising one or more gasoline components,
   wherein said $C_1$-$C_4$ alcohols include ethanol, and wherein said process further comprises seperating a portion of said ethanol prior to step (c).

2. The process of claim 1, wherein said syngas is derived from biomass.

3. The process of claim 1, further comprising removing a portion of water from said first stream prior to step (d).

4. The process of claim 1, further comprising removing a portion of water from said first stream prior to step (c).

5. The process of claim 1, further comprising separating a portion of said one or more ethers prior to step (d).

6. The process of claim 5, additionally comprising combining said portion of said one or more ethers with said gasoline components, thereby generating oxygenated gasoline components.

7. The process of claim 1, additionally comprising combining said portion of said ethanol with said gasoline components, thereby generating ethanol-containing gasoline components.

8. The process of claim 1, wherein said gasoline components include at least one $C_5$-$C_{10}$ hydrocarbon.

9. The process of claim 1, further comprising hydrotreating at least some of said gasoline components.

10. The process of claim 1, further comprising isomerizing at least some of said gasoline components.

11. The process of claim 1, wherein said gasoline components meet fuel specification ASTM D 4814-09a.

12. The process of claim 1, further comprising blending said gasoline components as a blendstock with another fuel, thereby generating gasoline.

13. The process of claim 12, wherein said gasoline meets fuel specification ASTM D 4814-09a.

14. The process of claim 1, wherein said third stream further includes non-gasoline components that are recycled back to step (a).

15. The process of claim 14, wherein said non-gasoline components include $C_2$-$C_4$ hydrocarbon gases.

16. A process for producing gasoline components, said process comprising:
(a) generating or providing syngas;
(b) converting said syngas using an alcohol-synthesis catalyst to a first stream comprising two or more $C_1$-$C_4$ alcohols;
(c) converting at least some of said first stream using a zeolite catalyst to one or more olefins; and
(d) converting at least some of said one or more olefins using said zeolite catalyst to a second stream comprising one or more gasoline components, said process further comprising seperating a portion of said two or more $C_1$-$C_4$ alcohols prior to step (c).

17. The process of claim 16, wherein said syngas is derived from biomass.

18. The process of claim 16, additionally comprising combining said portion of said two or more $C_1$-$C_4$ alcohols with said gasoline components, thereby generating oxygenated gasoline components.

19. The process of claim 16, wherein said $C_1$-$C_4$ alcohols include ethanol, and wherein said process further comprises separating a portion of said ethanol prior to step (c).

20. The process of claim 16, wherein said gasoline components meet fuel specification ASTM D 4814-09a.

21. The process of claim 16, further comprising blending said gasoline components as a blendstock with another fuel, thereby generating gasoline.

22. The process of claim 21, wherein said gasoline meets fuel specification ASTM D 4814-09a.

* * * * *